US009086238B2

(12) United States Patent
Valente (10) Patent No.: US 9,086,238 B2
(45) Date of Patent: Jul. 21, 2015

(54) BIOMASS DRYER/BURNER SYSTEM (71) Applicant: Peter Valente, Lasalle (CA)

(72) Inventor: Peter Valente, Lasalle (CA)

(*) Notice: Subject to any disclaimer, the term of this patent is extended or adjusted under 35 U.S.C. 154(b) by 64 days.

(21) Appl. No.: 13/833,015

(22) Filed: Mar. 15, 2013

(65) Prior Publication Data
US 2013/0206572 A1 Aug. 15, 2013

Related U.S. Application Data (63) Continuation-in-part of application No. 12/701,795, filed on Feb. 8, 2010, now Pat. No. 8,475,564.

(60) Provisional application No. 61/151,229, filed on Feb. 10, 2009.

(51) Int. Cl.
F26B 25/00 (2006.01)
B01D 53/14 (2006.01)
B01D 53/78 (2006.01)
B03C 3/017 (2006.01)
F23K 1/04 (2006.01)
F23G 7/10 (2006.01)

(52) U.S. Cl.
CPC ............ F26B 25/005 (2013.01); B01D 53/14 (2013.01); B01D 53/78 (2013.01); B03C 3/017 (2013.01); F23G 7/105 (2013.01); F23K 1/04 (2013.01); F23G 2203/20 (2013.01); F23G 2206/20 (2013.01); F23G 2206/201 (2013.01); F23J 2219/40 (2013.01); F26B 2200/02 (2013.01)

(58) Field of Classification Search
CPC ........ B01D 45/00; B01D 45/08; B01D 46/02; B01D 47/06; B01D 50/00; C10K 1/00

USPC .............. 95/1, 12, 13, 149, 214, 219; 96/189, 96/156, 174, 53, 244, 361–365, 301; 423/246

See application file for complete search history.

(56) References Cited

U.S. PATENT DOCUMENTS

| 1,483,348 | A | * | 2/1924 | Wetherbee et al. ............. 95/219 |
| 2,787,454 | A | * | 4/1957 | Coppola .................... 261/122.1 |
| 3,726,239 | A | | 4/1973 | Burbach |
| 3,926,592 | A | * | 12/1975 | Leva ............................... 95/216 |

(Continued)

FOREIGN PATENT DOCUMENTS

| CA | 1263518 A1 | 12/1989 |
| CA | 2 752 189 A1 | 8/2010 |

Primary Examiner — Duane Smith
Assistant Examiner — Minh-Chau Pham
(74) Attorney, Agent, or Firm — Gifford, Krass, Sprinkle, Anderson & Citkowski, P.C.

(57) ABSTRACT

The present invention provides a biomass dryer/burner unit having an air cleaning apparatus adapted to accept emissions from unit and to convert said emissions to clean air to meet government emission standards. The air cleaning apparatus including a spray scrubber fluidly connected to the unit adapted to moisten emissions, a recirculation tank in fluid communication with a collection tank, angled baffle plates, and the collection tank further having a sensor adapted to measure contaminant levels contained within the recirculation air filtration system. If the air contained within the collection tank measures above a predetermined contaminant level, then the air contained within the collection tank is directed back into the spray scrubber. If the air contained within the collection tank is below a predetermined level, then the air is exhausted into the atmosphere. Water is further allowed to recirculate back to the spray scrubber.

23 Claims, 4 Drawing Sheets (56) References Cited

U.S. PATENT DOCUMENTS

| | | | | |
|---|---|---|---|---|
| 3,992,177 A | * | 11/1976 | Welteroth | 55/288 |
| 4,245,569 A | * | 1/1981 | Fallon, III | 110/215 |
| 5,354,364 A | | 10/1994 | Johnson et al. | |
| 2005/0229780 A1 | | 10/2005 | Spink et al. | |
| 2006/0213370 A1 | * | 9/2006 | Leonard et al. | 96/243 |
| 2007/0014706 A1 | | 1/2007 | Herden et al. | |
| 2013/0206572 A1 | | 8/2013 | Valente | |

* cited by examiner

BIOMASS DRYER/BURNER SYSTEM

CROSS-REFERENCE TO RELATED APPLICATIONS

This application claims priority of U.S. Provisional Patent Application Ser. No. 61/151,229 filed Feb. 10, 2009, now U.S. Pat. No. 8,475,564 and is a Continuation in Part Application of U.S. patent application Ser. No. 12/701,795, which are incorporated herein by reference.

FIELD OF THE INVENTION

The present invention relates to air treatment. In particular this invention relates to the treatment of emissions from a biomass dryer/burner system.

BACKGROUND OF THE INVENTION

The burning of biomass in the form of construction and demolition wood residue and wood generated from logging and pest control activities has been a substantial increase over the past several years. As the cost of fossil fuels (e.g. fuel oil, bunker oil, and natural gas) has increased, many large-scale users of these fossil fuels have looked to biomass as an alternative to provide a cost-effective fuel to supply their energy needs.

Large scale commercial greenhouses in particular have been on the forefront of the conversion to biomass fuel as a replacement for natural gas and bunker oil which have historically been used to generate hot water which in turn is used to provide heat to their greenhouses during the seasonal heating season. Primary sources of biomass used in the greenhouse industry are organic materials such as construction and demolition wood waste, clean wood, farm waste such as tomato vines, yard waste from trees, grass clippings and bushes, furniture and green wood generated from the removal of trees.

Additionally, recent interest has been expressed in the development of small to midsize electrical generation plants which would use wood waste from logging operations to provide steam for the operation of the facility's steam turbines.

While the conversion of large scale heating systems in electrical generating facilities to biomass as a fuel is primarily driven by cost savings realized from using biomass versus fossil fuels, there are also significant environmental benefits to this conversion. Biomass is typically seen as a carbon-neutral fuel while fossil fuels are significant contributors to global warming through the release of greenhouse gases.

Many large scale energy users have already made the conversion to biomass fuel in the form of residual wood. However, these conversions have typically been made without adequate research, and problems associated with the conversion process have resulted in the project owner not fully realizing the cost savings in environmental benefits that are anticipated to result from the conversion. The major problems encountered include the ability to source "dry wood" as a biomass fuel supply, inappropriately designed combustion units, and inefficient pollution control equipment to control emissions from biomass combustion.

Wood removed under this program is chipped and used in biomass burners without adequate seasoning to allow the wood to dry out. Green wood has a moisture content of up to 80% while seasoned wood has a moisture content of between 20-25%. Burning of green wood results in a significantly reduced energy of the biomass burner which in turn results in fouling of the combustion unit from creosote buildup and increased atmosphere pollution associated with the burning of biomass. Accordingly, it would be advantageous to develop an air emissions control method and apparatus to be used in connection with a biomass dryer/burner system for drying and burning green wood.

A previously known air filtration system for a biomass dryer/burners is known as a bag system. A bag system is comprised of a plurality of filters, each filter operable to remove particles from dry air. Previously known bag systems are not capable of cleaning moist air, or an air/water mixture. Bag systems are only capable of filtering emissions from a biomass dryer/burner system emitting dry air emissions.

While the conversion from fossil fuels to biomass often results in cost savings and environmental benefits, the environmental benefits are not realized unless the emissions from the biomass burner are neutralized to government air emission standards. Accordingly, it would be advantageous to develop an air emissions control method and apparatus to be used in connection with a biomass dryer/burner system which enables the scrubbing of an air/water mixture.

SUMMARY OF THE INVENTION

The present invention provides a biomass dryer/burner having an air cleaning apparatus adapted to accept emissions from a biomass dryer/burner and to convert said emissions to clean air to meet government emission standards. The biomass dryer/burner unit includes a burner adapted to dry biomass, such as demolition waste or cut trees. The biomass dryer/burner further includes a dryer, the dryer adapted to contain wet product to be dried. The biomass dryer/burner system as a whole producing emissions from the dryer from the act of drying the biomass and further producing emissions from the burner from the act of burning the biomass. The air cleaning apparatus including a spray scrubber fluidly connected to the biomass dryer. The spray scrubber having a spray mechanism adapted to moisten the emissions from the biomass dryer/burner. Alternatively, the spray scrubber having a pool of water or chemicals wherein the emissions are forced through the pool of water or chemicals. The air cleaning apparatus further including a recirculation air filtration system fluidly connected to the spray scrubber. The recirculation air filtration system having at least one filter, a collection tank, and a recirculation tank. The collection tank further provided with a floor contained therein, allowing sediment to settle on the floor of the collection tank. The recirculation tank is in fluid communication with the collection tank, and the recirculation tank further having a sensor adapted to measure contaminant levels contained within the recirculation air filtration system. The collection tank also included a valve and a sensor for measurement of air quality. The valve 72 and the sensor 70 are connected to one another and in communication with one another.

The sensor contained within the collection tank and/collection tank measures levels of carbon monoxide or other contaminants of air and water. If the air contained within the collection tank above a predetermined contaminant level, then the air contained within the collection tank is directed back into the spray scrubber. If the air contained within the collection tank is below a predetermined level, then the air is exhausted into the atmosphere. The recirculation air filtration system as a whole is pressurized. The system further includes a plurality of pressure gauges and pressure release valves. The air/water mixture is pumped through the recirculation air filtration system by a series of at least one pump.

DETAILED DESCRIPTION OF THE INVENTION

The present invention provides a biomass dryer/burner system which efficiently and effectively dries or burns biomass and subsequently cleans the emissions produced during burning or drying by means of an attached air cleaning apparatus. Emissions produced from the burning or drying process, in turn, heat water used to generate steam, the steam in turn generates electricity. Emissions are carefully scrubbed to eliminate particulate matter and other contaminants before exhausting the air/water mixture to the atmosphere.

Figure 1:
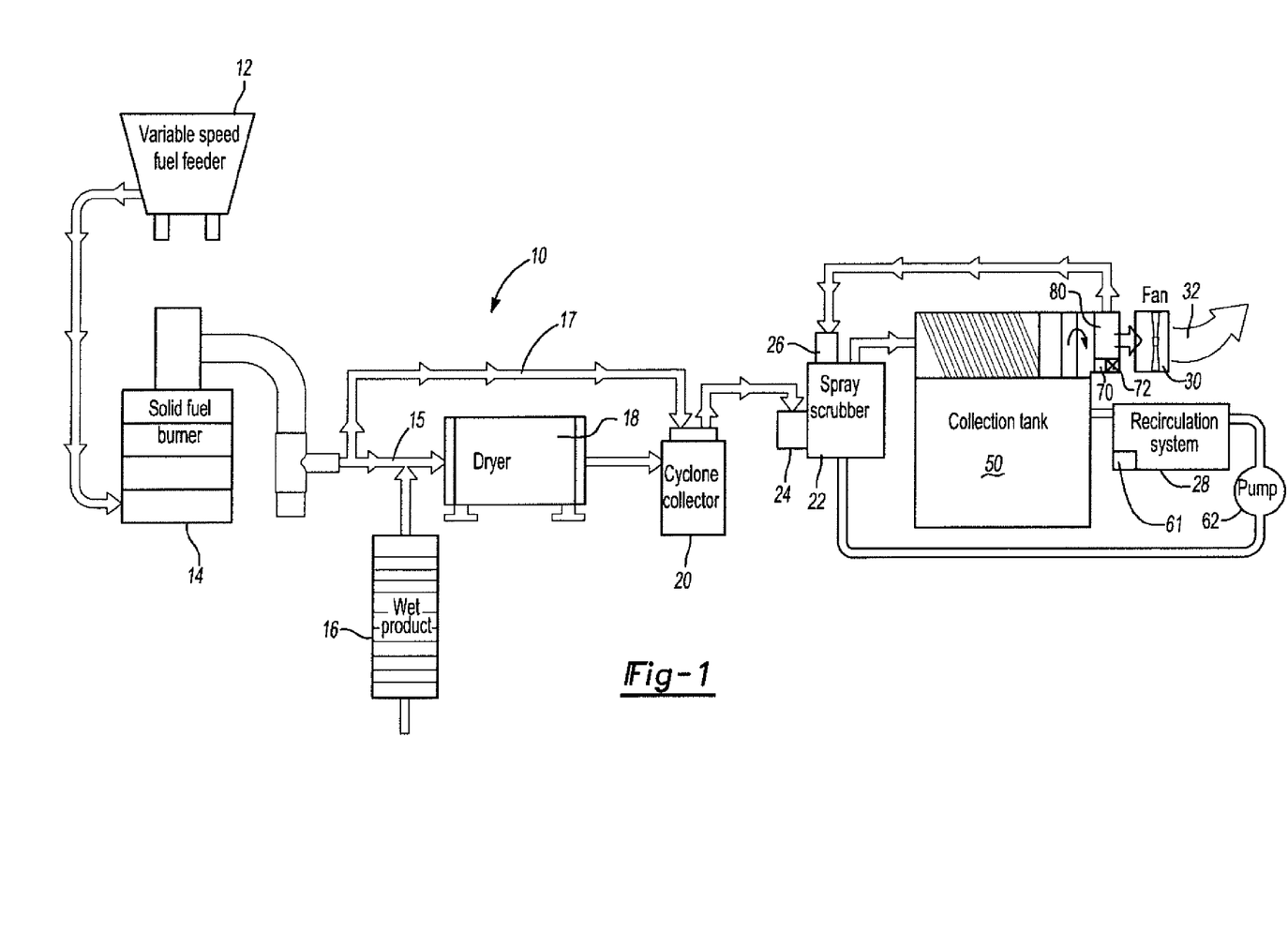
FIG. 1 is a diagram showing the biomass dryer/burner system.

The biomass dryer/burner system includes a variable speed fuel burner 12 and a solid fuel burner 14. The burner 14 is a 10 mmBTU per hour cyclonic biomass burner designed to burn construction and demolition waste. The burner 14 is of a wood fired burner type which has a high capacity and produces a temperature of 595°. Biomass material is introduced into one end of the rotary drum on the biomass burner 14. The drum has a diameter of approximately 7 feet and a length of 28 feet.

Primary sources of biomass used in the greenhouse industry are organic materials such as construction and demolition wood waste, clean wood, farm waste such as tomato vines, yard waste from trees, grass clippings and bushes, furniture and green wood generated from the removal of trees.

The burner 14 forces combustion gas and solid particles into the dryer 18, as shown by illustrative arrow 15, and the gasses and dust particulates are moved through the dryer 18 to the cyclone collector 20. Moisture sensors are mounted to the dryer 18 and sense the amount of drying contained within the dryer 18. When the wood chips, which used to be the wet product 16, are sufficiently dried, they are removed from the dryer 18. Dust and particulate matter are removed from the bottom of the cyclone collector 20 and moisture-laden air, or emissions, exits the cyclone collector 20 and enters the spray scrubber unit 22. The scrubber 22 is operable to accept air from the dryer or cyclone collector or solid fuel burner. The scrubber includes an air scrubber portion, a baffle portion and an electrostatic baffle portion. The baffles (angled or otherwise) encourage flow and disruption of the air flowing through the system. The particles or water fall to the bottom of the tank. Water is stored at the bottom of the tank. Air is then blown by means of a fan out of the scrubber 22.

Various other water storage tanks may be provided throughout the system to store water or air. These tanks may include baffles or electrostatic baffles to clean the air. The tanks may produce sludge or other waste from water.

In an alternative embodiment, the dryer 18 is bypassed. This embodiment is shown by illustrative arrow 17 wherein emissions and particulate matter from the burner 14 move directly into the cyclone collector 20. In this embodiment, the dryer 18 is completely bypassed whereby no drying of matter takes place. Emissions and particulate matter from the burner 14 are introduced directly into the cyclone collector 20 and onto the spray scrubber 22.

As shown by FIG. 1, the spray scrubber 22 consists of a large stainless steel tank having an inlet 24 on one side near the bottom. The emissions from the cyclone collector 20 are delivered through the inlet 24 to a duct which delivers the emissions into the bottom or below water level of the tank of the spray scrubber 22. The spray scrubber 22 may contain water or chemicals to maintain the proper pH. The spray scrubber 22 also contains a plurality of spray mechanisms to spray the emissions from the dryer 18 and the cyclone collector 20. The spray mechanisms (not shown) moisten the emissions to form an air/water mixture. In an alternative embodiment of the spray scrubber 22, the emissions from the drying process are forced through a pool of liquid. Said liquid is often water, chemicals or combination of water and chemicals. The air/water mixture then exits the spray scrubber and enters the recirculation system 28.

The system cleans, or scrubs, the air/water mixture to provide contaminant levels below a predetermined threshold. These contaminant levels are levels which are safe or exhaust into the atmosphere. These levels are determined by government standards. Sensors are provided for within the recirculation system 28, collection tank 50 and the evaluation chamber 80 (discussed below) to measure contaminant levels. If the contaminant levels are above the predetermined threshold, the air/water mixture is returned to the spray scrubber 22 and back into the recirculation system 28 to further clean and scrub the air. If the contaminant levels read by the sensor within the recirculation system 28 are below the predetermined threshold, then the air/water mixture is exhausted. The air/water mixture may be exhausted directly from the recirculation system or by returning the air/water mixture to the spray scrubber and subsequently exiting the spray scrubber through a fan 30. The recirculation system 28 may also include a fan to exhaust the clean air/water mixture.

While in the spray scrubber 22, the emissions move through a restricted passage or orifice to disperse and atomize the water into droplets. In the spray scrubber 22, the incoming emission stream is directed across or through a pool of water. The emissions have a high velocity (approximately 15.2 meters per second or 50 feet per second), creating a large number of liquid droplets. Both particles and gaseous pollutants are collected as they are forced through the liquid pool and impact the droplets. The spray scrubber 22 further includes a sensor adapted to sense emissions entering the spray scrubber 22. Once the sensor contained within the spray scrubber 22 senses emissions, the spray scrubber 22 activates and the emissions are moistened by means of either a pool of water or by means of at least one spray mechanism.

The recirculation system 28 is further comprised of a plurality of elements wherein emissions are pumped through these elements thereby producing air having contaminant levels below the government mandated, predetermined threshold.

Figure 2:
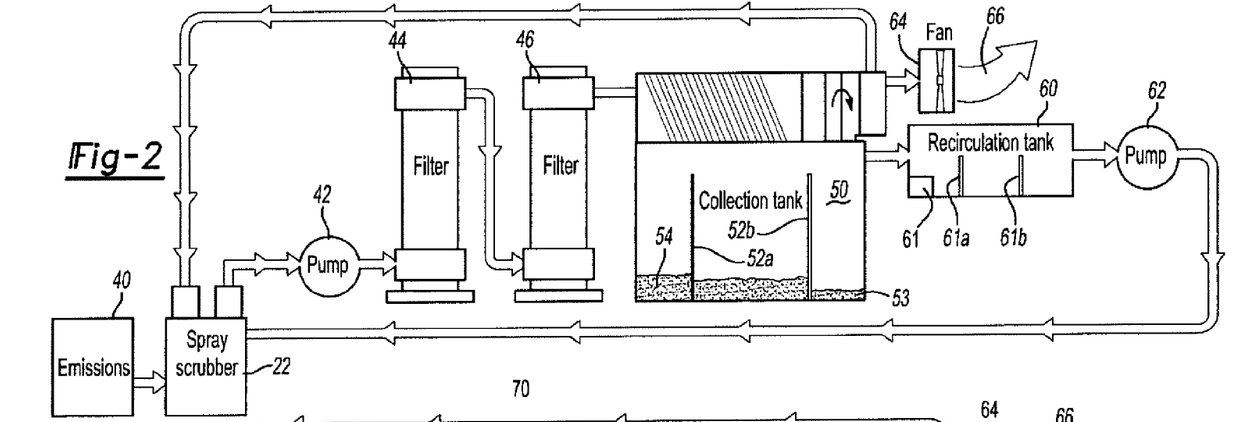
FIG. 2 is a recirculation air filtration system wherein contaminant levels are below the predetermined threshold.
Figure 3:
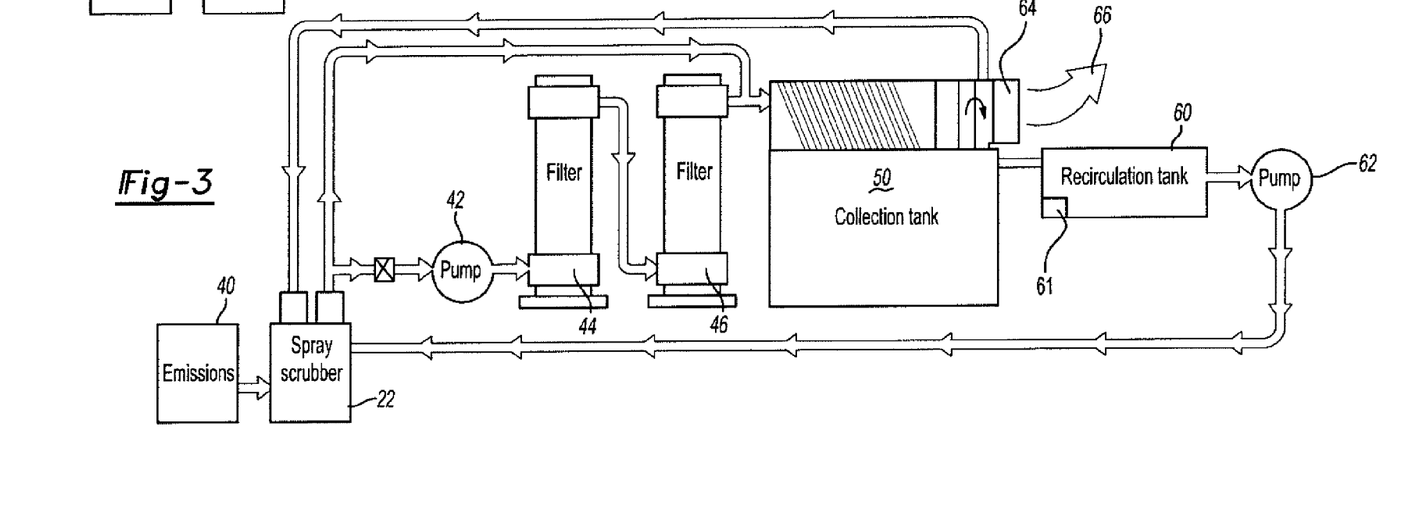
FIG. 3 is a diagram showing the recirculation air filtration system wherein contaminant levels are above a predetermined threshold.

Various embodiments of the system are shown in FIGS. 2 and 3. As shown by FIG. 2, emissions 40 from the dryer system 10 are introduced into the spray scrubber 22. An air/water mixture then exits the spray scrubber 22 by means of a pump 42 into a plurality of filters 44 and 46. The pump 42 may also be a gravity pump or not have a pump at all. In one embodiment as shown in FIG. 3, a valve controls the flow into the pump (or lack thereof) 42. The filters 44, 46 are appropriate dry/wet filters removing particulates. The filters 44, 46 in series remove different size particulates such as 5 micron particulates and 10 micron particulates. The air/water mixture then exits the filters 44, 46 and enters a collection tank 50. The system can also function without the filters.

FIG. 3 illustrates an alternative embodiment where air from the spray scrubber 22 bypasses the filters 44 and 48. The air is directed directly to the collection tank 50. FIG. 3 further illustrates an embodiments having the baffle plates of FIG. 5 disposed above the collection tank 50. The baffle plates include a mixture of both angled baffle plates and vertically aligned baffle plates. Any combination of both angled and vertical baffle plates may be provided. Further, the baffle plates (both angled and vertical) may be electrostatically charged to further facilitate breakdown of the particles. The air will be sprayed with water to further facilitate breakdown of the air particles.

In other embodiments and as shown in FIGS. 2 and 3, the collection tank includes the angled baffle plate section and the vertical baffle plate section. After the air passes through the angled baffle plate section, the air then travels through the vertical baffle plate section. In this embodiment, the angled baffle plates are not electrostatically charged, but the vertical plates are electrostatically charged. Of course, the reverse is also possible according to the needs of the user.

FIGS. 2 and 2 illustrate the flow and air and water through the system. Now discussing the flow of the water. Water is first entered into the flow at the spray scrubber 22. Water sprays the air within the spray scrubber 22. Water is then circulated through the system until it reaches the collection tank 50 having the sprayers. The sprayers then spray the air for further cleaning. There is always water within the collection tank 50. Water is not wasted in this system. Water is then pumped into the recirculation tank for testing. The water is then pumped via the pump 62 back to the spray scrubber 22 for further use. Minimal or no water is lost in this process. The system, including the recirculation tank 60 cleans the water. A sensor 61 measures the quality of the water. If the water is suitable, it is then pumped back to the spray scrubber 22.

Now discussing the flow of the air. Emissions and air exit the burner 14, the dryer 18 and the cyclone collector 20. Air then flows into the spray scrubber 22. Air from the spray scrubber 22 then enters the upper portion having the baffle plates of the collection tank 50 of the system having the plurality of baffle plates discussed above. The collection tank further includes a testing area for testing the quality of the air. A sensor is provided in the collection tank to test the quality of the air. The sensor may further be connected to a computer or electronic control unit (ECU) to determine the contaminant level of the air. A valve is further connected to the collection tank and the sensor to allow the flow of air out of the collection tank.

If the air quality is at a level suitable for release into the environment (i.e. meeting government standards, clean air, above a predetermined level), then the air is exited through the valve through the fan 30. If the air quality is not suitable (below a predetermined level), then the air is recirculated back to the spray scrubber 22.

Figure 4:
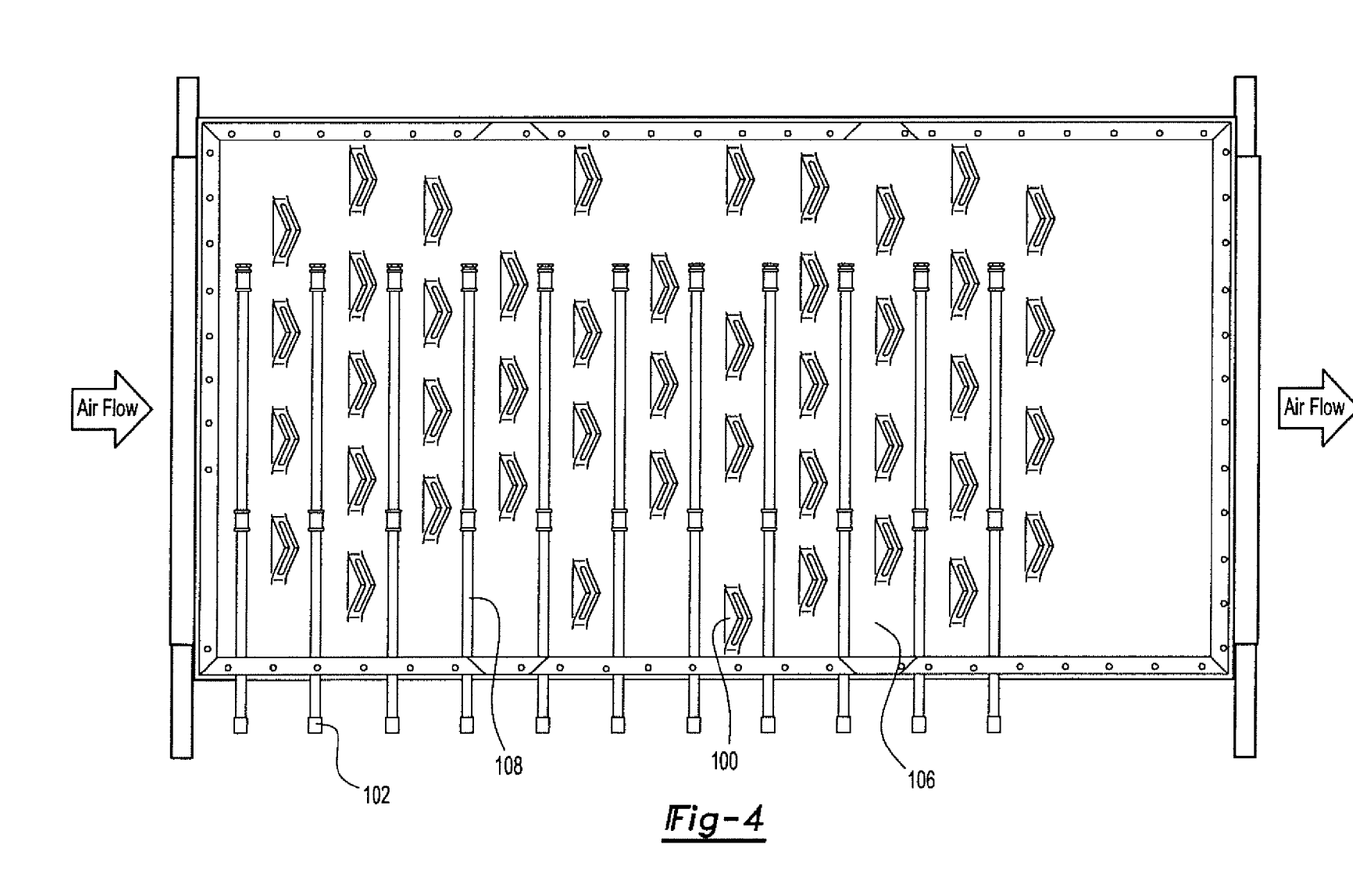
FIG. 4 is a top view of the angled baffle plates (the top cover of a tank) in the recirculation tank having a plurality of sprinklers.
Figure 5:
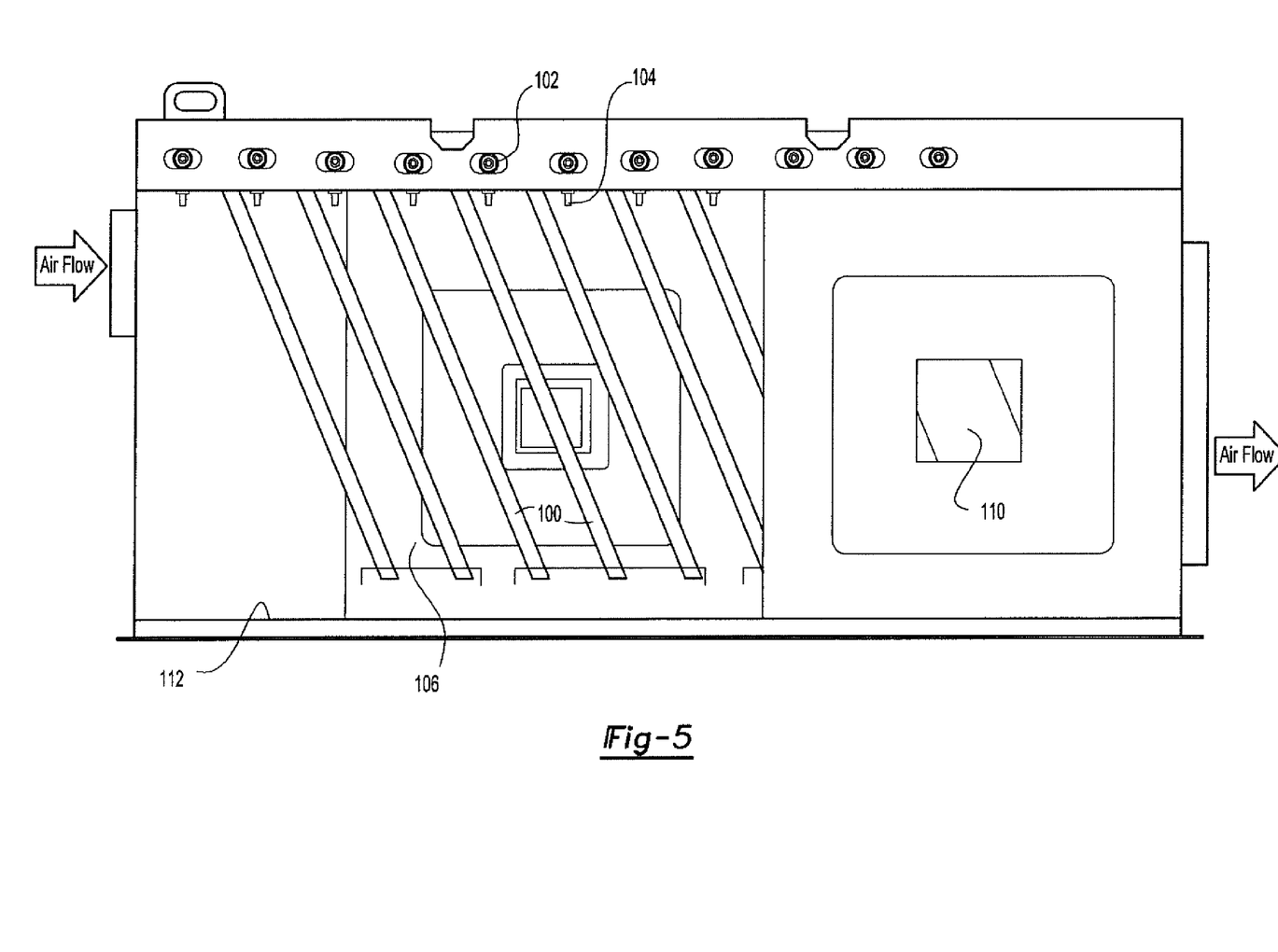
FIG. 5 is a side view of the angled baffle plates in the recirculation tank having a plurality of sprinklers.

The collection tank 50 may include water or other chemicals to neutralize the pH of the air/water mixture. The collection tank 50 is open until the portion as seen in FIGS. 4 and 5 is added. Particulate matter falls to the floor of the collection tank 50. The collection tank, in a preferred embodiment, is made of stainless steel. In one embodiment the collection tank 50 may include a plurality of baffle plates 52a, 52b. The baffle plates 52a, 52b facilitate the settling of particulate matter within the collection tank 50. The baffle plates 52a, 52b separate the liquid collected at the bottom of the collection tank 50. In one embodiment, the baffle plates 52a, 52b are planar and arranged generally vertical within the collection tank 50. In an alternative embodiment, the baffle plates 52a, 52b are arranged generally vertical or in a diagonal manner to facilitate contact of the baffle plates 52a, 52b to the air/water mixture. The baffle plates 52a, 52b include passageways allowing liquid to flow from one section with the collection tank 50 to another section. Said passageways may be holes or screening material such as mesh. In an alternative embodiment, the baffle plates 52a, 52b do not provide for any passageways allowing liquid to flow over the baffle plates 52a, 52b. Sediment and water 54 rests on the floor 53 of the collection tank 50. All elements and connecting conduits contained within the recirculation system 28 are pressurized.

Furthermore, the baffle plates 52a, 52b are provided having an electrical current running through the conductive plates. Angled baffle plates may also have the same electrical current (electrostatically charged). The electrical current, or electric charge, is provided for by means of a battery, or other power source. The baffle plates 52a, 52b and the collection tank 50 are both made of a conductive material, such as stainless steel. The electrical current provided within the baffle plates 52a, 52b is operable to remove dust particulates from the air/water mixture. The baffle plates 52a, 52b facilitate the removal of contaminates (particulate dust, odors and chemicals) from moist air, specifically an air/water mixture. Previous methods of removing airborne contaminants have been implemented for removal in dry air only. This method provides for removal in an air/water mixture. The baffle plates 52a, 52b having the electrical current burn dust or other particulate matter contained within the air/water mixture thereby removing the dust or particulate matter from the air/water mixture. Sediment removed from the air/water mixture collects on the floor of the collection tank 50. This sediment is removed once it reaches a high level. Furthermore, the baffle plates 52a, 52b having the electrical current neutralize odors within the air/water mixture.

The air/water mixture (usually just water) then exits the collection tank 50 and enters the recirculation tank 60. The recirculation tank 60 includes a sensor measuring contaminant levels within the air/water mixture. The contaminant levels measured are often of carbon monoxide, particulate matter in the water or other chemicals/additives. Carbon monoxide, and other contaminant, levels are required to be below a predetermined level before exhausting the air into the atmosphere. The sensor within the recirculation tank 60 measures levels of carbon monoxide to determine whether or not the air meets government standards to be released into the atmosphere. A sensor 70 and a valve 72 are further provided within the collection tank 50 to measure contaminant levels. If the contaminant level measured by the sensor within the recirculation tank 60 or collection tank 50 is above the predetermined government mandated level, then the air/water mixture is recirculated back into the spray scrubber 22 and subsequently pumped through the recirculation system again. If the contaminant levels measured by the sensor within the recirculation tank 60 or collection tank 50 are below the predetermined government mandated level, then the air/water mixture is pumped by means of a pump 62 and exhausted by means of a fan 64 as shown by the arrow 66.

In one embodiment, the recirculation tank 60 further includes baffle plates 61a, 61b. The baffle plates 61a, 61b facilitate the settling of particulate matter within the recirculation tank 60. The baffle plates 61a, 61b separate the liquid collected at the bottom of the recirculation tank 60. In one embodiment, the baffle plates 61a, 61b are planar and arranged generally vertical within the recirculation tank 60. In an alternative embodiment, the baffle plates 61a, 61b are arranged generally (such as baffle plates 100 are described below) vertical or in a diagonal manner to facilitate contact of the baffle plates 61a, 61b to the air/water mixture. The baffle plates 61a, 61b include passageways allowing liquid to flow from one section with the recirculation tank 60 to another section. Said passageways may be holes or screening material such as mesh. In an alternative embodiment, the baffle plates 61a, 61b do not provide for any passageways allowing liquid to flow over the baffle plates 61a, 61b.

Furthermore, the baffle plates 61a, 61b are provided having an electrical current running through the baffle plates 61a, 61b. The electrical current, or electric charge, is provided for by means of a battery, or other power source. The baffle plates 61a, 61b and the recirculation tank 60 are both made of a conductive material, such as stainless steel. The electrical current provided within the baffle plates 61a, 61b is operable to remove dust particulates from the air/water mixture. The baffle plates 61a, 61b facilitate the removal of contaminates (particulate dust, odors and chemicals) from moist air, specifically an air/water mixture. Previous methods of removing airborne contaminants have been implemented for removal in dry air only. This method provides for removal in an air/water mixture. The baffle plates 61a, 61b having the electrical current burn dust or other particulate matter contained within the air/water mixture thereby removing the dust or particulate matter from the air/water mixture. Sediment removed from the air/water mixture collects on the floor of the recirculation tank 60. This sediment is removed once it reaches a high level. Furthermore, the baffle plates 61a, 61b having the electrical current neutralize odors within the air/water mixture.

FIG. 3 depicts a situation wherein the sensor of the recirculation tank 60 and the collection tank 50 measured a contaminant level above the predetermined government mandated threshold for contaminant levels. A sensor 61 and sensor 70 within the recirculation tank 60 and the collection tank 50, respectively, measured above the certain level and thereby pumped the air/water mixture by means of a pump or fan back into the spray scrubber 22 as shown by the arrow 70. A valve 72 connected to the sensor 70 controls the flow of air out of the collection tank.

The function of these baffle blades or plates is to mix the air and break down 95% of particles that are in the emissions. The angle of the plates encourages the air and emissions to circulate and to create more turbulence and mixing. The angular or even triangular shape of the plates force the air to twist forcing the air particles to either hit the electrostatic baffle plates or each other, forcing the particulate matter to break down. With the help of the sprinklers, the baffle plates break down the particular matter. The particles then fall to the tank below. The baffles are placed on an inner wall of a tank. In the present embodiment, the angled plates are positioned on a ceiling of a tank.

FIGS. 4 and 5 illustrate the plurality of baffle plates 100 within the recirculation tank 60. The illustration in FIGS. 4 and 5 are embodiments of the top or ceiling of a tank. The baffles 100 may also be provided in the spray scrubber 22, the collection tank 50 or generally within the recirculation system 28. Further provided in the recirculation tank 22 (or in the spray scrubber 22, the collection tank 50 or generally within the recirculation system 28) is a plurality of sprinklers 102. In the present embodiment, the sprinklers 102 have an elongated main portion 108 extending into the main tank 106. The sprinklers 102 have sprinkler heads 104 extending from the elongated portion 108. Water or other liquids flow through the sprinklers 102 and out through the sprinkler heads 104. Water from the sprinklers 100 facilitates breaking down of the particulate matter in the air.

The baffle plates 100 are electrostatically charged to facilitate breaking down of the particulate matter. The baffle plates are angled at a 22 degree angles from a main floor 112 of the tank 106. However, the baffle plates 100 may be at any suitable angle to facilitate flow and removal of particulate matter from the air.

Air flows through the tank 106 and around the baffle plates 100. In the present embodiment, the baffle plates are generally triangular. Alternatively, the baffle plates 100 bay be generally square, rectangular or otherwise to encourage air flow. The angled nature of the baffle plates 100 forces the air and emissions to contact each baffle plate, and to bounce from plate to plate 100 thus providing an unforeseen advantage over the vertical baffle plates. The angled baffle plates encourage flow of air (by being angled), and still force the air and emissions to contact the plates multiple times since there is no easy path for the air to travel in. As such, the baffle plates 100.

Furthermore, the baffle plates 100 are provided having an electrical current running through the baffle plates 100. The electrical current, or electric charge, is provided for by means of a battery, or other power source. The baffle plates 100 and the tank 106 are both made of a conductive material, such as stainless steel. The electrical current provided within the baffle plates 100 is operable to remove dust particulates from the air/water mixture. The baffle plates 100 facilitate the removal of contaminates (particulate dust, odors and chemicals) from moist air, specifically an air/water mixture. Previous methods of removing airborne contaminants have been implemented for removal in dry air only. This method provides for removal in an air/water mixture. The baffle plates 100 having the electrical current burn dust or other particulate matter contained within the air/water mixture thereby removing the dust or particulate matter from the air/water mixture. Sediment removed from the air/water mixture collects on the floor of the recirculation tank 60. This sediment is removed once it reaches a high level. Furthermore, the baffle plates 100 having the electrical current neutralize odors within the air/water mixture.

Furthermore, FIG. 3 demonstrates a situation wherein the sensor of the recirculation tank 60 measured a contaminant level below the predetermined level as mandated by the government. The arrow 72 indicates the air/water mixture leaving the recirculation tank 60 by means of a pump 62 and exiting into the environment by means of the fan 64 as shown by the emissions arrow 66. The sensor 61 within the recirculation tank 60 is further connected to a release valve. When the sensor 61 measures the air to be a suitable level, the sensor triggers the valve to either release the air or recirculate the air. The system is also operable to circular water through the system along with the air.

FIGS. 2 and 3 further illustrate a separate chamber, or evaluation chamber 80, containing the sensor 70 and the valve 72. The evaluation chamber 80 is separated from the collection tank 50, but in fluid communication with the collection tank 50. Air enters the evaluation chamber 80 for evaluation by the sensor 70 and removal by the valve 72. If the sensor reads above a predetermined level, the air is circulated back to the scrubber. If the sensor reads a level below a predetermined level, the air is exhausted to the environment or atmosphere. This separate evaluation chamber 80 allows for undisturbed evaluation and sensing of the air at the sensor 70.

Any combination of angled, straight, non-electrostatic and electrostatic baffles may be provided in the various tanks and systems.

Furthermore, it is apparent that the above mentioned air purification recirculation system and apparatus may also be used to purify emissions or contaminated air from sources other than a biomass dryer/burner system. The air purification recirculation system and apparatus may be used to purify air within a room to appropriate safety levels. The system may be attached to a burner operable to burn a wide variety of materials such as paint, plastics or other inorganic materials. Furthermore, the system may be attached to a dryer operable to dry a wide range of materials, both organic and inorganic. The system may be adapted to clean and purify any emissions or otherwise contaminated air.

Having thus described my invention, in reference to the preferred embodiment, it is apparent that there may be modifications or variations of the invention which are within the scope of the invention. There are many different materials which may be used within the system, and the biomass dryer/burner system having an air purification apparatus may be in one of a variety of different configurations.

The invention claimed is:

1. A biomass modification system having an air filtration apparatus and recirculation system adapted to accept emissions to scrub said emissions to meet air quality standards, said air filtration apparatus comprising:
   a biomass modifier, the biomass modifier operable to accept and modify biomass, the biomass modifier producing emissions;
   a spray scrubber fluidly connected to the biomass modifier, the spray scrubber to moisten the emissions from the biomass modifier;
   a collection tank having a floor contained therein allowing sediment to settle on the floor of the collection tank, the collection tank having at least one baffle plate, the baffle plate angled to encourage air flow, the at least one baffle plate mounted to the ceiling of the collection tank, the at least one baffle plate being v-shaped to facilitate air-flow through the collection tank;
   the collection tank having a sensor connected to a valve, the valve connected to the collection tank, the collection tank fluidly connected to the spray scrubber and an exhaust fan, the valve discharges the emissions if the contaminant level measuring sensor reads below a predetermined level through the exhaust fan, or pumping the emissions back to the spray scrubber if the contaminant level measuring sensor reads a level above a predetermined level; and
   a recirculation tank fluidly connected to the collection tank, the recirculation air filtration system having at least one filter, the recirculation tank in fluid communication with the spray scrubber to move water from the recirculation tank back to the spray scrubber.

2. The air cleaning apparatus of claim 1, wherein the biomass modifier is a biomass burner.

3. The air cleaning apparatus of claim 1, wherein the biomass modifier is a biomass dryer.

4. The air cleaning apparatus of claim 1, wherein the biomass modifier is a biomass burner and dryer combination.

5. The air cleaning apparatus of claim 1, wherein the spray scrubber includes a sensor.

6. The air cleaning apparatus of claim 5, wherein the sensor of the spray scrubber senses emissions thereby automatically activating upon sensing of the emissions.

7. The air cleaning apparatus of claim 1, wherein the sensor within the collection tank measures levels of carbon monoxide.

8. The air cleaning apparatus of claim 1, wherein the air filtration apparatus is pressurized.

9. The air cleaning apparatus of claim 8, wherein the air filtration apparatus includes at least one pressure gauge.

10. The air cleaning apparatus of claim 8, wherein the air filtration apparatus includes at least one pressure release valve.

11. The air cleaning apparatus of claim 1, wherein the filter is adapted to remove particles having a diameter of 10 microns or less.

12. The air cleaning apparatus of claim 1, wherein said filter is adapted to remove particles having a diameter of 5 microns or less.

13. The air cleaning apparatus of claim 1, wherein the recirculation air filtration system further includes at least one pump.

14. The air cleaning apparatus of claim 1, wherein the at least one baffle plate of the collection tank includes an aperture permitting fluid communication between divisions of the holding tank, the divisions created by the baffle plates.

15. The air cleaning apparatus of claim 1, wherein the collection tank contains chemicals adapted to neutralize the emissions.

16. The air cleaning apparatus of claim 1, wherein the collection tank is stainless steel.

17. The air cleaning apparatus of claim 1, wherein the spray scrubber includes a plurality of spray mechanisms adapted to moisten the emissions, the spray mechanisms mounted to the ceiling of the collection tank, the spray mechanisms positioned between the angled baffle plates.

18. The air cleaning apparatus of claim 1, wherein the spray scrubber includes a pool of water contained therein wherein the emissions are forced across or through the pool of water to moisten the emissions.

19. The air cleaning apparatus of claim 1, wherein said collection tank further includes a secondary spray mechanism.

20. The air cleaning apparatus of claim 1 wherein the baffle plates are electrostatically charged.

21. The air cleaning apparatus of claim 1 wherein the sensor is provided in an evaluation chamber adjacent to, but separated from, the collection tank.

22. The air cleaning apparatus of claim 1, wherein the air filtration apparatus is powered by gravity.

23. The air cleaning apparatus of claim 1 wherein the angled baffle plates are v-shaped, the baffle plates each having three edges wherein one of the three edges connects directly to the ceiling of the collection tank.

* * * * *